INVENTOR.
DONALD W. COLLIER

United States Patent Office 3,081,417
Patented Mar. 12, 1963

3,081,417
PHOTOELECTRIC STREET LAMP CONTROLS
Donald W. Collier, Pines Lake, Wayne Township, N.J., assignor to McGraw-Edison Company, Elgin, Ill., a corporation of Delaware
Filed Feb. 24, 1959, Ser. No. 795,215
2 Claims. (Cl. 317—124)

This invention relates to circuit control systems for turning on and off street lamps respectively when the intensity of the ambient light falls below and rises above a predetermined level.

An object of the invention is to utilize a photoelectric cell in a novel control circuit for the aforestated purpose.

Another object is to provide a photoelectric street lamp control which is of a simple and economical form and which has inherently the necessary delayed action to prevent false operation responsive to momentary changes in ambient light intensity.

A further object is to provide such improved street lamp controls wherein an enhanced sensitivity and an inherent time delay is achieved by a storage of heat energy controlled by the photoelectric cell.

A growing trend is to turn street lamps off and on individually in response to changes in the ambient light intensity. There is a growing need therefore for individual street lamp control circuits which are compact, economical and dependable under all conditions of temperature, humidity, etc. A particular object of my invention is to provide improved street lamp controls which fulfill this need.

The invention is carried out by controlling a heating coil by a photoelectric cell for vaporizing a liquid in an expansible chamber to operate a power switch in the lighting circuit when the light intensity falls to a given level. By so storing heat energy to operate the power switch the same can be controlled by currents within the current carrying capacity of photoelectric cells and without the need for slave relays. The needed delay in operating the switch as the light intensity falls and in releasing the switch as the light intensity rises is achieved inherently by the thermal lag in the heat storage portion of the system.

Other objects and features of my invention will be apparent from the following description and the appended claims.

In the description of my invention reference is had to the accompanying drawings, of which:

In the usual street lamp control circuit, current from an A.C. power source is rectified and fed through a photo-conductive cell to control a sensitive relay. This relay, in turn, operates a heavy duty slave relay which controls the lighting circuit. Time delay of either electrical or mechanical nature is built into the control system so that the lamps will not be turned on or off responsive to temporary changes in light intensity such as from passing clouds, lightning, etc. Also, such delayed action is needed because when mercury vapor lamps are used they must not be restarted after being turned off until they cool down.

The present invention eliminates the need for the rectifier and for any separate built-in time delay. Also, it achieves a greater switch operating power from a given control current to enable street lamp circuits to be controlled directly by photocells without the need for slave relays. The invention is particularly suited and is herein described for controlling a single street lamp—i.e., one or more light bulbs of a single stanchion—but without intending any unnecessary limitation thereto.

Figure 1:
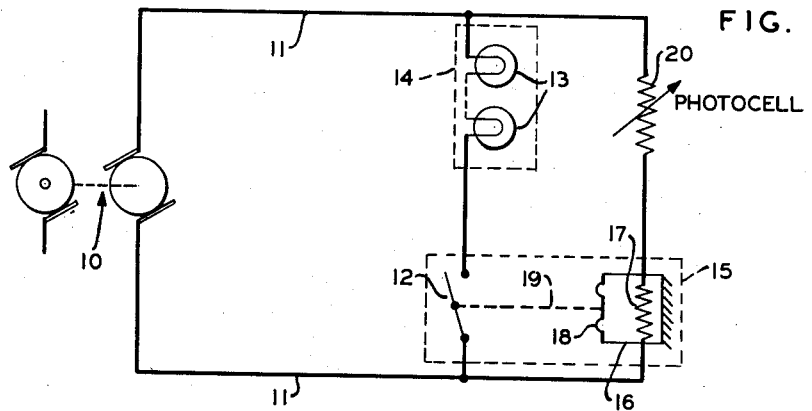
FIGURE 1 is a circuit diagram of one embodiment of street lamp control system according to my invention.

As shown in FIGURE 1, a source of A.C. power as from a motor generator set 10 is connected by a circuit 11 through a power switch 12 and one or more light bulbs 13 as of a single stanchion diagrammatically represented at 14. The control switch 12 is part of an electrically operable pressure switch device 15 comprising an hermetically sealed chamber 16 having a heater winding 17 therein. The chamber contains a small amount of a vaporizable liquid such as for example methyl alcohol, so that when the heater winding is energized it will cause a high vapor pressure to be built up in the chamber to expand a diaphragm 18 at one end thereof. This diaphragm is coupled as indicated at 19 to the movable element of the switch 12 so as to hold this switch open when the chamber is in an expanded condition. The heater winding 17 is connected across the power source 10 through a photocell 20 which by way of specific example is illustrated as being of the photoconductive type. Such photoconductive cell may be for example of cadmium sulphide, lead sulphide or selenium and will have a resistance which varies inversely to the intensity of the ambient light to which the photocell is exposed.

During daytime, the photocell 20 has a low resistance, causing the heater winding to be energized and the liquid in the chamber to be vaporized. For instance, about one drop of methyl alcohol for a capsule chamber of one centimeter diameter is sufficient for this purpose since methyl alcohol, when vaporized, has a 550 times increase in volume at normal atmospheric pressure. The resultant expanded condition of the chamber causes the switch 12 to be held open as shown in FIGURE 1. However, when the ambient light intensity falls below 1 to 2 foot candles the photocell 20 has a greatly increased resistance causing the energization of the heater winding to be essentially cut off. The chamber therefore cools and contracts to allow the switch 12 to close under its own biasing force (not shown) and light the street lamp 13 but this occurs after a time delay dependent upon the thermal lag in the system. Vice versa, when the intensity of the ambient light increases above this level the heater winding will again be energized to expand the chamber and open the switch 12 to turn off the lamp 13 after a predetermined delay.

It is found that when the chamber 16 is a disk-like capsule about one centimeter in diameter and provided with external insulation, a dissipation of about .5 watt in the heating coil 17 will cause the switch to be operated respectcively in about 5 minutes and .5 minute for outside ambient temperatures of minus 40° F. and 125° F. Reversely, the switch will release after the heating current is turned off respectively in about 4 minutes and 19 minutes for outside ambient temperatures of minus 40° F. and 125° F. The delay period during activation is accompanied by the storing of heat energy in the expansible chamber enabling the operation of heavy duty power switches by small control currents in the heater winding. For instance, cadmium sulphide photoconductive cells may be utilized to control directly a micro switch-type WA-2R of Minneapolis Honeywell Regulator Company, Freeport, Illinois, having a power rating of 1200 watts.

Figure 2:
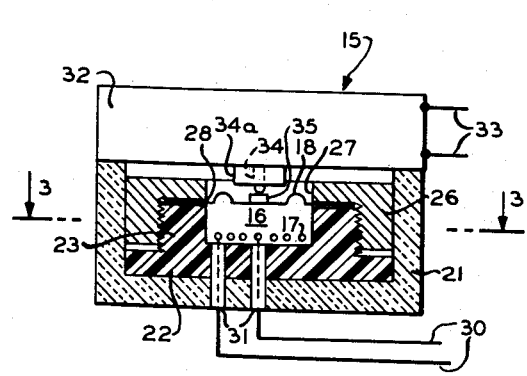
FIGURE 2 is a view partly in section showing the construction of an electrically operable pressure switch for this control system.
Figure 3:
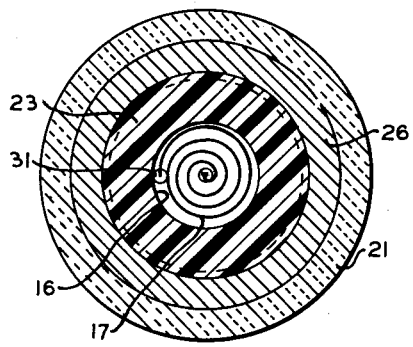
FIGURE 3 is a sectional view on the line 3—3 of FIGURE 2.

A typical construction for the pressure switch device 15 may comprise, as shown in FIGURES 2 and 3, a cylindrical cup 21 of insulating material such as of fibre glass or magnesia. Mounted in the bottom of this cup is a circular housing member 22 such as of high temperature plastic or ceramic. This housing member has an externally threaded upstanding boss 23 provided with a central circular well which forms the chamber 16 aforementioned, this chamber being about 1 centimeter in diameter and 1 centimeter deep and having the diaphragm 18 closing the chamber at the top. This diaphragm overlies the boss and is clamped at its outer edge thereto by a cylindrical cap 26 such as of metal, ceramic or plastic. This cap has a central opening 27 conforming in diameter to that of the chamber 27 and is threaded tightly onto the boss with interposition of suitable sealing washers 28 to seal the diaphragm hermetically to the housing 22. Mounted on the bottom wall of the chamber 16 is the heater winding 17 suitably of spiral form as shown in FIGURE 3. Lead wires 30 run downwardly through openings in the housing 22 and cup 21 as through glass tubings 31 fused or otherwise sealed to the lead wires and housing. Mounted suitably onto the cup 21 is a housing 32 of the power switch 12 from which projects lead wires 33 and a pushbutton 34, the latter extending downwardly into engagement with a central button 35 on the diaphragm. Placed in the sealed chamber 16 is a small quantity—for example, about one drop—of a vaporizable liquid such as methyl alcohol having a boiling temperature at about 64.5° C. When the heater winding is not energized the diaphragm is retracted and the pushbutton 34 is in an extended position closing the switch 12. However, when the heater winding is energized the diaphragm is expanded to press the pushbutton 34 inwardly and open the switch 12. Surrounding the pushbutton 34 is an annular member 34a rigidly mounted on the housing of the switch and providing a stop for the diaphragm against which the button 35 would abut should any inordinate pressure develop within the chamber 16.

Figure 4:
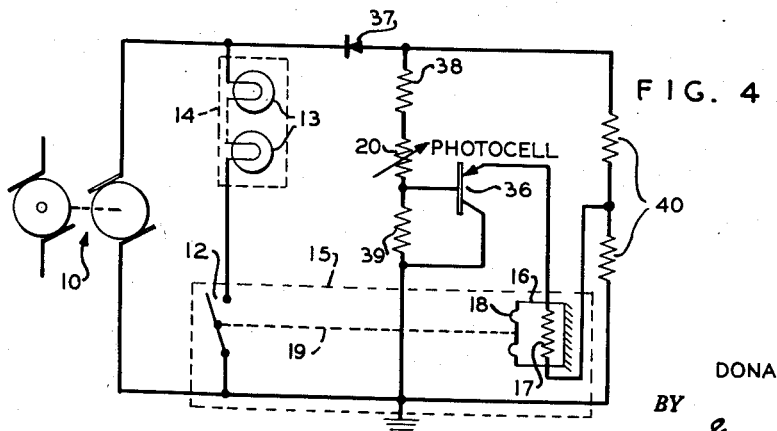
FIGURE 4 is a circuit diagram illustrating a second embodiment of the invention.

In applications where heater currents are to be controlled in excess of the carrying capacity of the photocell, a circuit such as is illustrated in FIGURE 4 may be employed. Here, the power source 10 feeds through the switch 12 to control the street lamps 13 as before, but the photocell 20 operates through a transistor 36 to control the heater winding 17. For example, the source 10 may be now connected through a rectifier 37, resistor 38, the photocell 20 and a resistor 39. The resistor 39 is connected in the base emitter circuit of the transistor with the emitter being connected to ground and the base to the junction between the photocell and the resistor 39. The collector is connected through the heater winding 17 to a resistor-type voltage divider circuit 40 connected through the rectifier 37 across the power source 10. It is by this circuit possible to amplify the normal power output of the photocell to provide approximately 2 watts of power to the heater coil. With such available power to the heater coil, it is permissible to use less heat insulation—i.e., a reduced wall thickness of the cup 21— to get shorter release time of the switch when the light level drops. For example, if the heat transfer coefficient between the chamber 24 and the outside ambient is quadrupled to match the increase in available heating power, the switch will be operated in about 4 minutes when the outside ambient is minus 40° and it will release in less than 5 minutes when the ambient temperature is as high as 125° F.

The particular embodiments of my invention herein shown and described are intended to be illustrative and not limitative of my invention, since the same are subject to changes and modifications without departure from the scope of my invention, which I endeavor to express according to the following claims.

I claim:
1. A light sensitive control apparatus comprising, a control switch, a photocell, and means controlled by said photocell for providing a delayed operation of said switch to an open position when the ambient light intensity rises above a predetermined level and a delayed movement to a closed position when the light intensity falls below said level, comprising an expansible chamber having a movable wall coupled to said switch, a vaporizable liquid in said chamber, a heater winding for vaporizing said liquid, means for controlling said heater winding by said photocell, and heat insulating means between said chamber and the outside ambient to provide a progressive storage of heat energy in said chamber causing a delayed operation of said switch responsive to an energization of said heater winding and causing a delayed release of said switch after energizing current to said heater winding is at least substantially cut off.

2. A light sensitive control apparatus comprising a power switch, a photocell, an expansible chamber containing a volatizable liquid and coupled to said power switch for controlling the same, a heater winding for vaporizing said liquid, an energizing circuit for said heater winding including said photocell, and insulating means thermally insulating said chamber from the outside ambient to provide a gradual storage of heat energy sufficient to operate said power switch within a predetermined time interval of continuous energization of said heater winding by current controlled by and conducted through said photocell, said insulating means also reducing the rate of loss of said stored energy to the outside ambient to delay the release of said power switch after the energization of said heater winding is cut off.

References Cited in the file of this patent
UNITED STATES PATENTS

| | | |
|---|---|---|
| 1,699,752 | Randall | Jan. 22, 1929 |
| 2,697,766 | Goldmuntz | Dec. 21, 1954 |
| 2,862,665 | Matthews | Dec. 2, 1958 |
| 2,898,525 | Jacobs | Aug. 4, 1959 |
| 2,900,520 | Frank | Aug. 18, 1959 |
| 2,954,479 | Cibelius | Sept. 27, 1960 |